United States Patent
Bold

(10) Patent No.: US 8,699,781 B1
(45) Date of Patent: Apr. 15, 2014

(54) EMBEDDED SYMBOLOGY FOR USE WITH SCENE IMAGING SYSTEM

(75) Inventor: Peter H. Bold, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 709 days.

(21) Appl. No.: 12/814,670

(22) Filed: Jun. 14, 2010

(51) Int. Cl.
*G06K 9/00* (2006.01)

(52) U.S. Cl.
USPC .................. 382/141; 345/1.1; 345/7

(58) Field of Classification Search
None
See application file for complete search history.

(56) References Cited

U.S. PATENT DOCUMENTS

| | | | |
|---|---|---|---|
| 5,357,263 A | 10/1994 | Fischer | |
| 5,361,307 A | 11/1994 | Hartley | |
| 6,373,055 B1 | 4/2002 | Kerr | |
| 7,212,175 B1 * | 5/2007 | Magee et al. | 345/7 |
| 7,355,179 B1 | 4/2008 | Wood | |
| 7,403,133 B2 | 7/2008 | He | |
| 7,525,448 B1 | 4/2009 | Wilson | |
| 7,564,372 B1 | 7/2009 | Bailey | |
| 7,605,774 B1 | 10/2009 | Brandt | |
| 7,617,022 B1 | 11/2009 | Wood | |
| 2002/0088951 A1 | 7/2002 | Chen | |
| 2004/0201768 A1 | 10/2004 | Cahill | |
| 2005/0007261 A1 * | 1/2005 | Berson et al. | 340/945 |
| 2005/0007386 A1 * | 1/2005 | Berson et al. | 345/633 |
| 2008/0180351 A1 * | 7/2008 | He | 345/1.1 |
| 2009/0160951 A1 * | 6/2009 | Anderson et al. | 348/208.4 |
| 2009/0293012 A1 * | 11/2009 | Alter et al. | 715/810 |
| 2010/0141555 A1 * | 6/2010 | Rorberg et al. | 345/8 |
| 2010/0207843 A1 * | 8/2010 | Coloma et al. | 345/1.1 |
| 2010/0231705 A1 * | 9/2010 | Yahav et al. | 348/115 |
| 2010/0309222 A1 * | 12/2010 | Feyereisen et al. | 345/629 |
| 2012/0007979 A1 * | 1/2012 | Schneider et al. | 348/116 |

* cited by examiner

*Primary Examiner* — Marissa Thein
(74) *Attorney, Agent, or Firm* — Donna P. Suchy; Daniel M. Barbieri

(57) ABSTRACT

A scene imaging system (SIS) for providing an enhanced image with embedded symbology. The SIS includes an image sensor assembly for receiving a real-world image and providing a sensed image containing raw image sensor assembly data. An image processing system receives and processes the sensed image and manufacturing tolerance/aircraft installation information. The image processing system provides an image processing system output containing a sensed image with embedded symbology. A database maintains the manufacturing tolerance/aircraft installation information. An output interface element is operatively connected to the image processing system for receiving the processor output for use by a computer for a display. The embedded symbology in the sensed image is used 1) in a monitoring mode to detect frozen, flipped or misaligned SIS images in a continuous real-time manner, 2) in an alignment mode to align the SIS to ensure that the sensed image is conformal to the operator's field of view; and, 3) provide electronic boresighting of the sensed image when the camera is replaced.

17 Claims, 2 Drawing Sheets

EMBEDDED SYMBOLOGY FOR USE WITH SCENE IMAGING SYSTEM

BACKGROUND OF THE INVENTION

1. Field of the Invention

The present invention relates generally to scene imaging systems (SIS's) and more particularly to an SIS for providing an enhanced image with embedded symbology.

2. Description of the Related Art

Many devices, such as aircraft, are typically designed to provide a real-world view of the out-the-window scene for at least one operator to operate the device. In the past, a view of the scenery outside the device was provided through passive means, such as a cockpit windshield, or artificial means through sensors and displays.

Scene imaging systems such as Enhanced Vision Systems (EVS) supplement out-the-window vision via the use of camera/sensor imagery superimposed over the real-world view. EVS include sensors that can detect and display images of objects that pilots would not normally be able to see when looking through the cockpit window of an aircraft. For example, EVS can present data from sensors that can penetrate low-visibility weather conditions and darkness, such as radar or forward-looking infrared (FLIR). The data presented from the sensors is derived from the current environment and not from a computer database. EVS can be used on both head-down and head-up displays. Other features such as navigation enhancements and proactive systems to avoid controlled flight into terrain and runway incursions can also be integrated in EVS.

To achieve lower minima landing credit using an Infrared (IR) based EVS system, the integrity of both the IR sensor and display device (e.g., a Head Up Guidance System) must meet minimal integrity requirements based on the function being performed. To meet these integrity requirements the system must have a method to detect the display of frozen, flipped or misaligned EVS images.

In response to these problems, U.S. Pat. No. 7,355,179, issued to R. B. Wood et al., entitled "Scene Imaging System Integrity Monitor and Method Thereof", discloses a scene imaging system (SIS) integrity monitor for monitoring the required operation of an imaging sensor of an SIS. The SIS is of a type including: i) an imaging sensor, ii) an imaging system processor, and iii) an imaging system display. The SIS integrity monitor includes a signal emitter assembly for receiving emitter drive signals from an imaging system processor and directing a monitoring image into the active field of view of an imaging sensor for sensed image generation. The generated image is provided to the imaging system processor for analysis. The imaging system processor evaluates the location and modulation state of the generated image to determine if faults exist in the image generation or image display paths.

U.S. Pat. Pub. No. 20020088951, by J. C. Chen, entitled "Method and Apparatus for Detecting Aberrations in an Optical System" discloses a method of detecting aberrations associated with a projection lens utilized in an optical lithography system. Chen discloses doing a 'static' optical quality test during manufacture. It does not involve doing a real time, continuous 'monitor' of the entire imaging system; specifically detecting run-time errors in the system (i.e. random failures in the camera that could lead to a misleading display of information such as the video from the camera freezing).

U.S. Pat. No. 7,355,179, issued to J. R. Kerr, entitled "Enhanced Vision System Sensitive to Infrared Radiation", discloses an enhanced vision system and method for use with vision systems with an imager sensitive to infrared radiation of less than 2-microns in wavelength, to produce a first image signal. Another imager sensitive to infrared radiation at least 3-microns in wavelength may be used to produce a second image signal. Preferably, the first image signal represents sensed electric light sources, and the second image signal represents sensed background such as terrain, runways, structures, and obstacles. A signal processor combines an image signal representing locally maximum values of the first image signal with the second image signal to create a displayed image. As in the Chen system, the Kerr system does not involve doing a real time, continuous 'monitor' of the entire imaging system. Kerr only covers the use of multiple IR cameras to generate a single, merged, video display. As will be disclosed below, present applicant's invention, on the other hand, monitors the real-time integrity of such a system.

SUMMARY OF THE INVENTION

In a broad aspect, the present invention is a scene imaging system (SIS) for providing an enhanced image with embedded symbology. The SIS includes an image sensor assembly for receiving a real-world image and providing a sensed image containing raw image sensor assembly data. An image processing system receives and processes the sensed image and manufacturing tolerance/aircraft installation information. The image processing system provides an image processing system output containing a sensed image with embedded symbology. A database maintains the manufacturing tolerance and aircraft installation information. An output interface element is operatively connected to the image processing system for receiving the processor output for use by a computer for a display. The embedded symbology in the sensed image is used 1) in a monitoring mode to detect frozen, flipped or misaligned SIS images in a continuous real-time manner, 2) in an alignment mode to align the SIS to ensure that the sensed image is conformal to the operator's field of view; and, 3) to provide electronic boresighting of the sensed image when the camera is replaced.

In another broad aspect, the invention is embodied as a method for providing a sensed image with embedded symbology in a scene imaging system (SIS) of a head up display (HUD). The method comprises the following steps:

a) providing a sensed image containing raw image sensor assembly data, utilizing an image sensor assembly;

b) identifying and adjusting a boresight pixel location utilizing manufacturing tolerance/aircraft installation information;

c) aligning the SIS so that the sensed image is conformal to the operator's field of view; and, d) monitoring the SIS to detect a flipped, frozen or misaligned sensed image utilizing continuously updated, real-time embedded symbology.

The step of aligning the SIS includes the following sub steps:

a) creating an embedded alignment image centered on the identified boresight pixel to provide visual indications of the SIS attitude as well as vertical and horizontal scaling;

b) using the alignment image to physically position the SIS such that the alignment image overlays a correlating alignment image on the HUD and/or an external target board; and c) using the alignment image to electronically position the sensed image for small positional errors which may occur during the replacement of the SIS.

The step of monitoring the SIS includes the following sub steps:

a) embedding monitoring symbols within the sensed image at predefined positions;

b) detecting and identifying the monitoring symbols within the sensed image in a HUD computer;

c) measuring the positions of the identified monitoring symbols in the HUD computer; and, d) comparing the measured positions of the monitoring symbols versus stored position values in the HUD computer.

The present invention is particularly advantageous in that the aligning procedure can be reduced to a single person's effort if the HUD supports this (i.e., a monitor showing the HUD display placed near the front of the aircraft would allow a single technician to overlay one set of symbology with the other). In monitoring mode, the HUD can use the boresight pixel for electronic boresight with no need for an aircraft personality module or alignment interface.

DETAILED DESCRIPTION OF THE INVENTION

Figure 1:
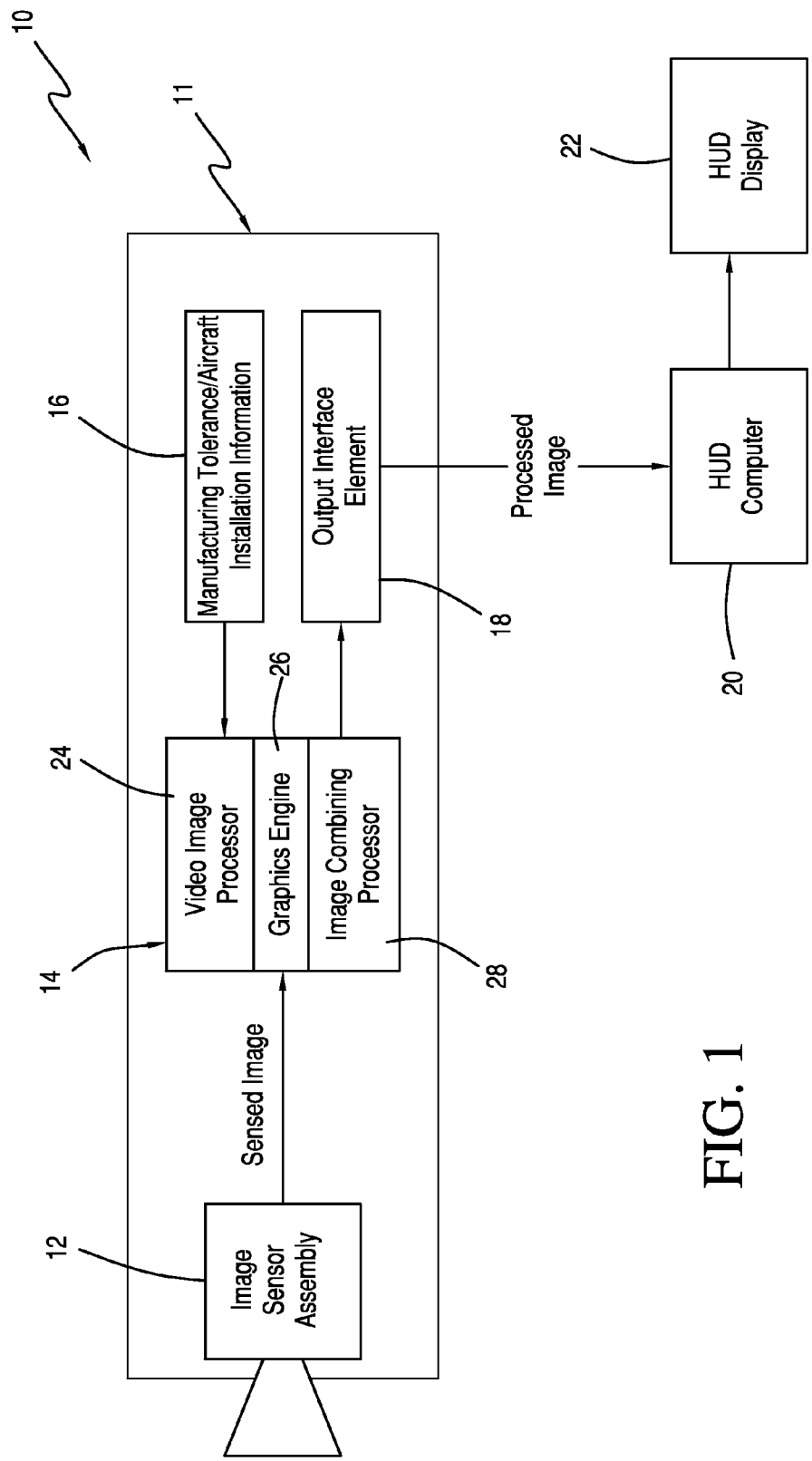
FIG. 1 is a block diagram of the enhanced flight vision system (EFVS) for an aircraft, including a scene imaging system for providing an enhanced image with embedded symbology, of the present invention.

Referring now to the drawings and the characters of reference marked thereon, FIG. 1 illustrates a preferred embodiment of the enhanced flight vision system (EFVS) for an aircraft, designated generally as 10, including the scene imaging system (SIS) of the present invention, designated generally as 11. The scene imaging system (SIS) 11 includes an image sensor assembly 12 for receiving a real-world image and providing a sensed image containing raw image sensor assembly data. The SIS is likely an enhanced vision system (EVS). The image sensor assembly 12 may include, for example, a focal plane array (FPA) and lense(s). The SIS may include any number of scene imaging sensors, e.g. visible light, infrared, millimeter-wave radar, X-band (weather) radar, etc. Other types of SIS's may include, for example, surveillance systems, fire detection systems, and imaging systems used for automated parts assembly.

An image processing system, designated generally as 14, receives and processes the sensed image. It also receives manufacturing tolerance/aircraft installation information from a database 16. Such information may be, for example, the depression (look down) angle of the SIS as well as calibration offset information on the positioning of the FPA. The database may comprise a persistent memory with programmable interface. This could be, for example, a flash or an EPROM. The image processing system 14 provides an image processing system output containing a sensed image with embedded symbology. The embedded symbology typically includes a scaled test pattern providing an indication of the SIS attitude (pitch, roll and yaw) as well as any vertical and horizontal scaling for alignment and a dynamic test pattern which provides indication of a flipped, frozen or misaligned image. The embedded symbology is visible while in the alignment mode and is a color not visible on the display while in monitoring mode. The embedded symbology may be augmented by a synthetic horizon line driven by pitch and roll inputs from an inertial reference system.

An output interface element 18 is operatively connected to the image processing system for receiving the processor output for use by a computer 20 for a display 22. The output interface element 18 may comprise a converter for formatting the data to a format recognizable by the display 22. The output interface 18 could be in the form of an ARINC 818 digital output, but may be in the form of SMPTE-170/RS-170 or any other applicable video output. The embedded symbology in the sensed image is used 1) in a monitoring mode to detect frozen, flipped or misaligned EVS images in a continuous real-time manner, 2) in an alignment mode to align the EVS to ensure that the sensed image is conformal to the operator's field of view; and, 3) to provide electronic boresighting of the sensed image when the camera is replaced.

The image processing system 14 preferably includes a video image processor 24 for processing the sensed image; a graphics engine 26 for generating the symbology to be embedded; and, an image combining processor 28 for combining the generated symbology with the sensed image. The video image processor 24 and the image combining processor 28, may be, for example, a field programmable gate array (FPGA) or an application specific integrated circuit (ASIC). The graphics engine 26, may be, for example a 2D graphics generator capable of drawing precise vectors updating in real-time.

Figure 2:
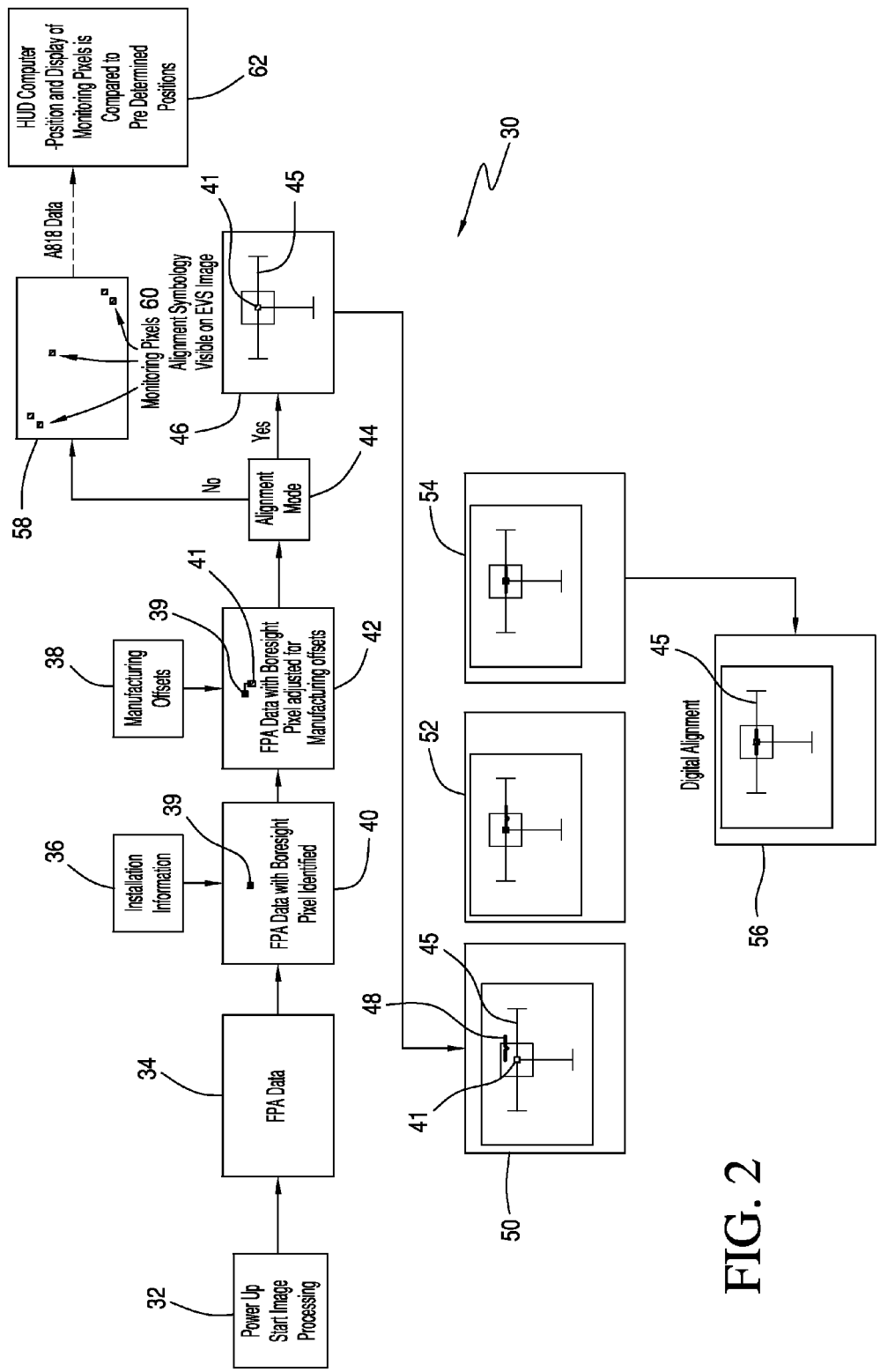
FIG. 2 is a functional diagram of the scene imaging system of the present invention.

Referring now to FIG. 2, the method for aligning an enhanced visual system (EVS) is illustrated, designated generally as 30. In the start of the procedure, the system 11 is powered up and image processing is commenced (process block 32). The data from the focal plane array, i.e. FPA data 34 (raw image sensor assembly data) is used in conjunction with installation database information 36 and manufacturing tolerance data 38 (i.e. collectively, manufacturing tolerance/ aircraft installation information) to identify a boresight pixel 39 (process blocks 40, 42), and adjust that boresight pixel, as shown by numeral designation 41. Early aircraft installation information is typically used to determine what the IR sensor depression angle will be. This information will be used to determine the exact pixel that corresponds to the aircraft waterline boresight which is the point on the FPA (image sensor assembly) where an object positioned on the horizon along the longitudinal axis of the aircraft would be sensed when the SIS is properly installed. During the assembly of the IR sensor the manufacturing offsets will be determined and stored in onboard memory and used to adjust the location of the calculated boresight pixel.

In alignment mode (see process block 44) the SIS is aligned so that the sensed image is conformal to the operator's field of view. In alignment mode, an embedded alignment image 45 is created that is centered on the identified boresight pixel 41 to provide visual indications of the SIS attitude (pitch, roll and yaw) as well vertical and horizontal scaling (see process block 46). The alignment image 45 is used to physically position the SIS such that the alignment image 45 overlays a correlating alignment image 48 on the HUD and/or an external target board (see process blocks 50, 52, 54). A black box has been added to process blocks 50, 52, 54 to represent looking through the HUD. The alignment image 45 is used to electronically position the sensed image for small positional errors which may occur during the replacement of the SIS (see process block 56). This may be accomplished by identifying elements of the alignment image and comparing them to stored position values in a HUD computer. If the alignment position and the stored positions are within a specified tolerance, then the image will be digitally shifted into final position within the HUD. If the alignment position and the stored positions are not within a specified tolerance, the image is not shifted and the alignment procedure is not exited.

The SIS is monitored to detect a flipped, frozen or misaligned sensed image utilizing continuously updated, real-time embedded symbology (process block 58). Monitoring symbols (pixels) 60 are embedded within the sensed image at predefined positions. The monitoring symbols are detected and identified within the sensed image in the HUD computer 62. The positions of the identified monitoring symbols in the HUD computer are measured. The measured positions of the monitoring symbols versus stored position values in the HUD computer are compared. If the measured position and the stored position are within specified tolerances, then the image is deemed to be properly aligned and displayed on the HUD. If the measured position and the stored position are not within specified tolerances, then an image is not displayed and instead a fault is indicated.

Other embodiments and configurations may be devised without departing from the spirit of the invention and the scope of the appended claims.

The invention claimed is:

1. A scene imaging system (SIS) for providing an enhanced image with embedded symbology, comprising:
   a) an image sensor assembly for receiving a real-world image and providing a sensed image containing raw image sensor assembly data;
   b) an image processing system for receiving and processing said sensed image and manufacturing tolerance/aircraft installation information, said image processing system for providing an image processing system output containing a sensed image with embedded symbology;
   c) a database for maintaining said manufacturing tolerance/aircraft installation information; and,
   d) an output interface element operatively connected to said image processing system for receiving said processor output for use by a computer for a display;
   wherein the image processing system is programmed to 1) operate in a monitoring mode to detect frozen, flipped or misaligned SIS images in a continuous real-time manner, 2) operate in an alignment mode to align the SIS to ensure that the sensed image is conformal to the operator's field of view; and, 3) operate to provide electronic boresighting of the sensed image when the SIS is replaced.

2. The system of claim 1, wherein said image processing system comprises:
   a) a video image processor for processing said sensed image;
   b) a graphics engine for generating the symbology to be embedded; and,
   c) an image combining processor for combining said generated symbology with said sensed image.

3. The system of claim 1, wherein said database comprises a persistent memory with programmable interface.

4. The system of claim 1, wherein said output interface element comprises a converter for formatting the data to a format recognizable by a display.

5. The system of claim 1, wherein said output interface element comprises a converter for formatting the data to a format recognizable by a head up display (HUD).

6. The system of claim 1, wherein said image sensor assembly comprises a focal plane array (FPA) and lenses for capturing real world data in a defined field of view.

7. The system of claim 1, wherein said SIS comprises an enhanced vision system (EVS).

8. The system of claim 1, wherein said embedded symbology comprises a scaled test pattern providing indication of the SIS attitude (pitch, roll and yaw) as well as any vertical and horizontal scaling for alignment and a dynamic test pattern which provides indication of a flipped, frozen or misaligned image.

9. The system of claim 1, wherein said embedded symbology is visible while in said alignment mode and is a color not visible on the display while in said monitoring mode.

10. The system of claim 1, wherein said embedded symbology is augmented by a synthetic horizon line driven by pitch and roll inputs from an inertial reference system.

11. An enhanced flight vision system (EFVS) for an aircraft, comprising:
   a) scene imaging system (SIS) for providing an enhanced image with embedded symbology, comprising:
      i) an image sensor assembly for receiving a real-world image and providing a sensed image containing raw image sensor assembly data;
      ii) an image processing system for receiving and processing said sensed image and manufacturing tolerance/aircraft installation information, said image processing system for providing an image processing system output containing a sensed image with embedded symbology;
      iii) a database for maintaining said manufacturing tolerance/aircraft installation information; and,
      iv) an output interface element operatively connected to said image processing system for receiving said processor output for use by a head up display (HUD) computer for display on a HUD;
   wherein the image processing system is programmed to 1) operate in a monitoring mode to detect frozen, flipped or misaligned SIS images in a continuous real-time manner, 2) operate in an alignment mode to align the SIS to ensure that the sensed image is conformal to the operator's field of view; and, 3) operate to provide electronic boresighting of the sensed image when the SIS is replaced;
   b) a head up display (HUD) computer operatively connected to said output interface element for:
      i) detecting and identifying monitoring symbols within said sensed image;
      ii) measuring the positions of said identified monitoring symbols; and,
      iii) comparing said measured positions of said monitoring symbols versus stored position values in the HUD computer wherein:
         1. the image is deemed to be properly aligned and displayed on the HUD if said measured position and said stored position are within specified tolerances; and,
         2. an image is not displayed and instead a fault is indicated if said measured position and said stored position are not within specified tolerances; and,
   c) a HUD display operatively connected to said HUD computer for receiving a HUD computer output signal and displaying a HUD image.

12. The system of claim 11, wherein said image processing system comprises:
   a) a video image processor for processing said sensed image;
   b) a graphics engine for generating the symbology to be embedded; and,
   c) an image combining processor for combining said generated symbology with said sensed image.

13. The system of claim 11, wherein said database comprises a persistent memory with programmable interface.

14. The system of claim 11, wherein said output interface element comprises a converter for formatting the data to a format recognizable by a display.

15. The system of claim 11, wherein said output interface element comprises a converter for formatting the data to a format recognizable by a head up display (HUD).

16. The system of claim 11, wherein said embedded symbology comprises a scaled test pattern providing indication of the SIS attitude (pitch, roll and yaw) as well as any vertical and horizontal scaling for alignment and a dynamic test pattern which provides indication of a flipped, frozen or misaligned image.

17. The system of claim 11, wherein said embedded symbology is visible while in said alignment mode and is a color not visible on the display while in said monitoring mode.

* * * * *